United States Patent
Dickson et al.

(10) Patent No.: US 10,653,989 B2
(45) Date of Patent: May 19, 2020

(54) DUST FILTRATION UNIT

(71) Applicant: Iron X Energy, LLC, Claysville, PA (US)

(72) Inventors: David Dickson, Washington, PA (US); Stephen Reihner, Avella, PA (US)

(73) Assignee: Iron X Energy, LLC, Claysville, PA (US)

( * ) Notice: Subject to any disclaimer, the term of this patent is extended or adjusted under 35 U.S.C. 154(b) by 127 days.

(21) Appl. No.: 15/644,111

(22) Filed: Jul. 7, 2017

(65) Prior Publication Data

US 2018/0008928 A1    Jan. 11, 2018

Related U.S. Application Data

(60) Provisional application No. 62/359,273, filed on Jul. 7, 2016.

(51) Int. Cl.
| | |
|---|---|
| *B01D 46/00* | (2006.01) |
| *B01D 46/02* | (2006.01) |
| *B65G 69/18* | (2006.01) |
| *E21B 43/26* | (2006.01) |

(52) U.S. Cl.
CPC ......... *B01D 46/023* (2013.01); *B01D 46/002* (2013.01); *B01D 46/02* (2013.01); *B65G 69/181* (2013.01); *B01D 2271/02* (2013.01); *B65G 69/18* (2013.01); *E21B 43/26* (2013.01)

(58) Field of Classification Search
CPC .... B01D 46/00; B01D 46/023; B01D 46/002; B01D 46/0021; B01D 46/02; B01D 2271/02; B65G 69/18–188; E21B 43/26
USPC ...... 55/341.1–341.7, 361–382, 385.1–385.8, 55/490–519; 95/273
See application file for complete search history.

(56) References Cited

U.S. PATENT DOCUMENTS

| | | | | |
|---|---|---|---|---|
| 5,961,696 | A * | 10/1999 | Gombos | B01D 46/0005 55/493 |
| 8,702,849 | B2 | 4/2014 | Matson | |
| 2012/0304860 | A1 * | 12/2012 | Matson | B01D 46/02 95/273 |
| 2014/0020346 | A1 * | 1/2014 | Esswein | B01D 46/02 55/304 |

FOREIGN PATENT DOCUMENTS

WO    WO-2015039069 A1 *  3/2015  ........... B01D 46/002

* cited by examiner

*Primary Examiner* — T. Bennett McKenzie
(74) *Attorney, Agent, or Firm* — The Webb Law Firm

(57) ABSTRACT

A dust filtration unit for a frac sand storage bin and a method for using the same is disclosed. The dust filtration unit includes an adapter base adapted for attachment to an opened inspection hatch on the sand storage bin, a diffuser manifold attached to the adapter base, and a top plate of the diffuser manifold defining a plurality of filter bag orifices. Each of a plurality of filter bags is releasably attached to one of the plurality of filter bag orifices. In a non-limiting embodiment, the dust filtration unit further includes a hinge between the adapter base and the diffuser manifold, wherein the hinge rotatably attaches the adapter base to the diffuser manifold.

20 Claims, 10 Drawing Sheets

DUST FILTRATION UNIT

CROSS-REFERENCE TO RELATED APPLICATION

This application claims priority to U.S. Provisional Patent Application No. 62/359,273, titled "Dust Filtration Unit" and filed on Jul. 7, 2016, the disclosure of which is hereby incorporated by reference in its entirety.

BACKGROUND OF THE INVENTION

Field of the Invention

This invention relates generally to dust filtration units. More particularly, the invention relates to dust filtration units for hydraulic fracturing sand storage bins. The dust filtration unit of the present invention prevents the release of hazardous dust into the atmosphere while the storage bins are being loaded from a pneumatic trailer.

Description of Related Art

Hydraulic fracturing (hereinafter "fracking") is a method of stimulating underground natural gas and oil wells in order to extract the hydrocarbons contained therein. A pressurized slurry of water and sand is injected into a rock formation in order to fracture the rock and create passageways through which the hydrocarbons can flow to a wellbore. The sand component ("frac sand") of the slurry is transported to fracking well sites onboard pneumatic trailers.

Typically, a pneumatic trailer for transporting frac sand has a series of hoppers, each having an outlet connected to a material conveying conduit. To unload the frac sand from the pneumatic trailer, the material conveying conduit is coupled to an inlet port on the side of a sand storage bin. The pneumatic trailer contains a blower which generates air pressure to force the frac sand out of the hoppers, through the material conveying conduit, and into the storage bin.

During the process of unloading frac sand from the pneumatic trailer, the storage bin must be vented in order to prevent backpressure from building up in the storage bin while the blower is operating. Venting the storage bin is achieved by opening an inspection hatch or vent which is typically located on the top of the bin. However, opening the hatch to vent the storage bin permits frac sand dust to escape into the atmosphere, resulting in substantial dust pollution.

In addition to causing dust pollution around the well site, escaped frac sand dust poses severe health risks to workers. Dust from crystalline silica—the major constituent of most frac sand—is classified by the Occupational Safety and Health Administration (OSHA) as a carcinogen, and prolonged exposure to even low levels of silica dust can cause debilitating respiratory disease.

Some effort has been made to contain frac sand dust during the offloading of pneumatic trailers. U.S. Pat. No. 8,702,849 to Matson discloses a dust screen for dry bulk storage units which includes a cloth filter bag secured to an inspection hatch of a storage bin by an elastic cord and a binding strap. However, by attaching the dust screen directly to the inspection hatch, the hatch cannot be used to monitor the fill level of the storage bin, or to inspect the inside of the storage bin for other purposes. Further, the dust screen of Matson is unprotected from the weather, allowing rain and snow to wet the filter bag which, in turn, causes the frac sand dust to adhere to and clog the filter bag.

SUMMARY OF THE INVENTION

The present invention relates to a dust filtration unit for a frac sand storage bin. The dust filtration unit includes an adapter base adapted for attachment to an opened inspection hatch on the sand storage bin, a diffuser manifold attached to the adapter base, and a top plate of the diffuser manifold defining a plurality of filter bag orifices. Each of a plurality of filter bags is releasably attached to one of the plurality of filter bag orifices.

In a non-limiting embodiment, the dust filtration unit of the present invention further includes a hinge between the adapter base and the diffuser manifold, wherein the hinge rotatably attaches the adapter base to the diffuser manifold.

In another non-limiting embodiment, a bottom rim of the adapter base is angled at 14° to 20° relative to the horizon such that the plurality of filter bags stand vertically when the dust filtration unit is mounted to the frac sand storage bin.

In another non-limiting embodiment, the dust filtration unit further includes a gasket between the adapter base and the diffuser manifold.

In another non-limiting embodiment, the hinge is rotatable between a closed position in which the adapter base is sealingly connected to the diffuser manifold, and an opened position in which the fill level of the frac sand storage bin may be monitored.

In another non-limiting embodiment, the adapter base is a hollow, open-ended, rigid structure.

In another non-limiting embodiment, the diffuser base is an open-bottomed, rigid structure.

In another non-limiting embodiment, the dust filtration unit further includes a support frame surrounding the plurality of filter bags, wherein a closed end of each of the plurality of filter bags is attached to the support frame.

In another non-limiting embodiment, the dust filtration unit of the present invention further includes a weather cover surrounding at least a top portion of the support frame.

The present invention also relates to a method for preventing the release of frac sand dust into the atmosphere during the unloading of frac sand from a pneumatic trailer. The method includes providing a frac sand storage bin having an inspection hatch; attaching a dust filtration unit to the hatch, the dust filtration unit including an adapter base, a diffuser manifold, and plurality of filter bags attached to the diffuser manifold, wherein the diffuser manifold is rotatably attached to the adapter base via a hinge; coupling an outlet port of the pneumatic trailer to the frac sand storage bin; and displacing the frac sand from the pneumatic trailer into the frac sand storage bin In a non-limiting embodiment, the method further includes securing a weather cover to the dust filtration unit.

In another non-limiting embodiment, dust generated by displacing the frac sand from the pneumatic trailer into the frac sand storage bin is contained by the dust filtration unit.

In another non-limiting embodiment, air is permitted to permeate the plurality of filter bags of the dust filtration unit.

BRIEF DESCRIPTION OF THE DRAWING(S)

DESCRIPTION OF THE INVENTION

Figure 1:
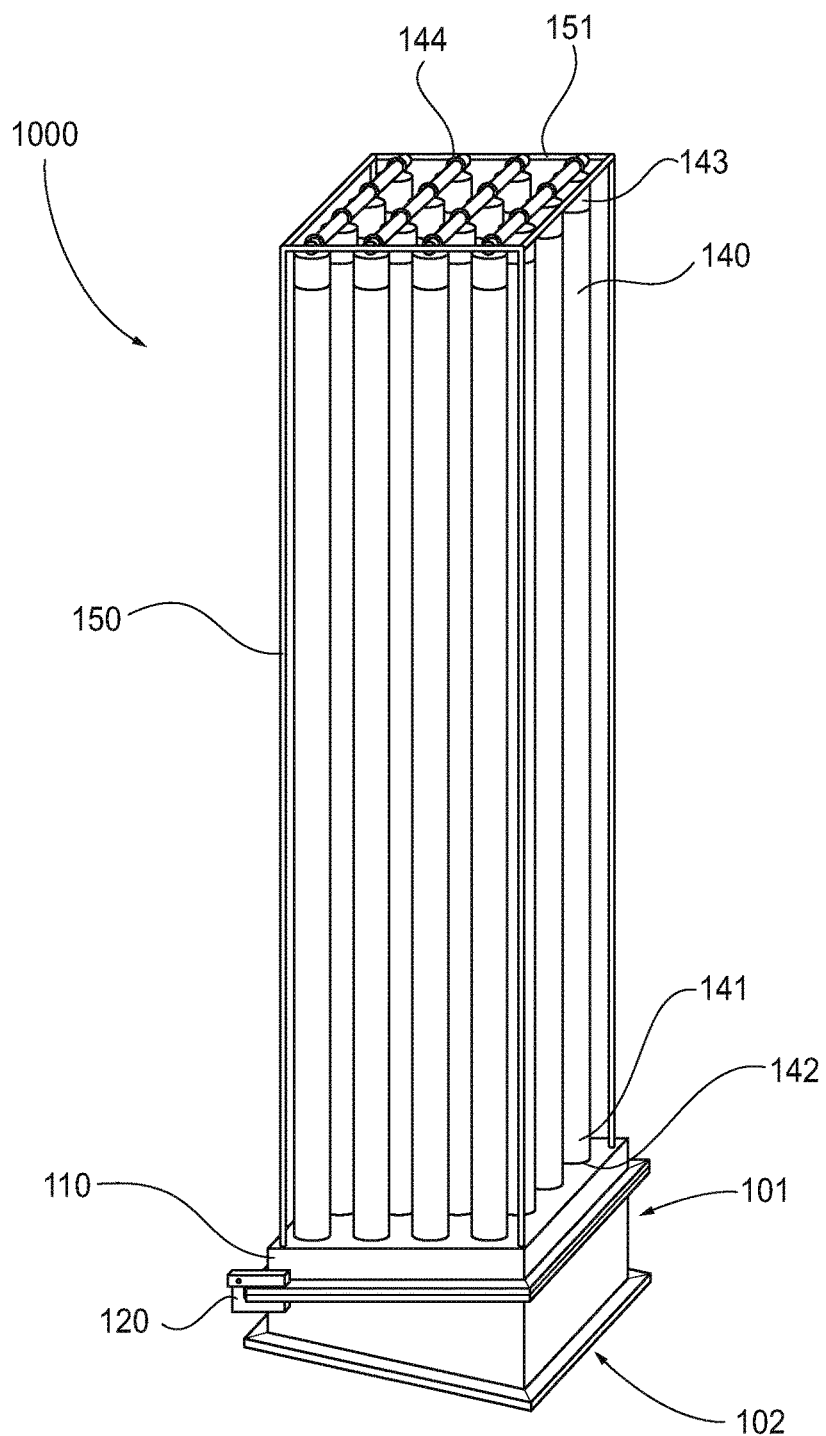
FIG. 1 is a perspective view of a dust filtration unit in accordance with the present invention.

For purposes of the description hereinafter, the terms "upper", "lower", "right", "left", "vertical", "horizontal", "top", "bottom", and derivatives thereof, shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

Referring now to FIG. 1, a dust filtration unit 1000 in accordance with the present invention generally includes a plurality of vertically oriented filter bags 140 operatively mounted to a diffuser manifold 110. The diffuser manifold 110 is rotatably mounted to an adapter base 101 via a hinge 120. A support frame 150 extends vertically from the diffuser manifold 110. The support frame 150 includes a plurality of support posts which are rigidly attached to the diffuser manifold 110 at one end and attached to a top frame 151 at an opposite end. The support frame 150 surrounds and supports the plurality of filter bags 140 and provides a frame for the cover 160, shown in FIGS. 2-10.

Each of the plurality of filter bags 140 has an open end 141 into which dust-laden air flows from the diffusor manifold 110. The open end 141 of each filter bag 140 includes a connecting flange 142 which is snapped into a respective filter bag orifice 113 of the diffuser manifold. The plurality of filter bags 140 are detachable from their respective filter bag orifices 113 for maintenance. A closed end 143 of each filter bag 140 is suspended by a hook 144 from the top frame 151. In this manner, the filter bags 140 are oriented approximately vertical within the support frame 150, optimizing the efficiency of the dust filtration unit 1000.

Figure 2:
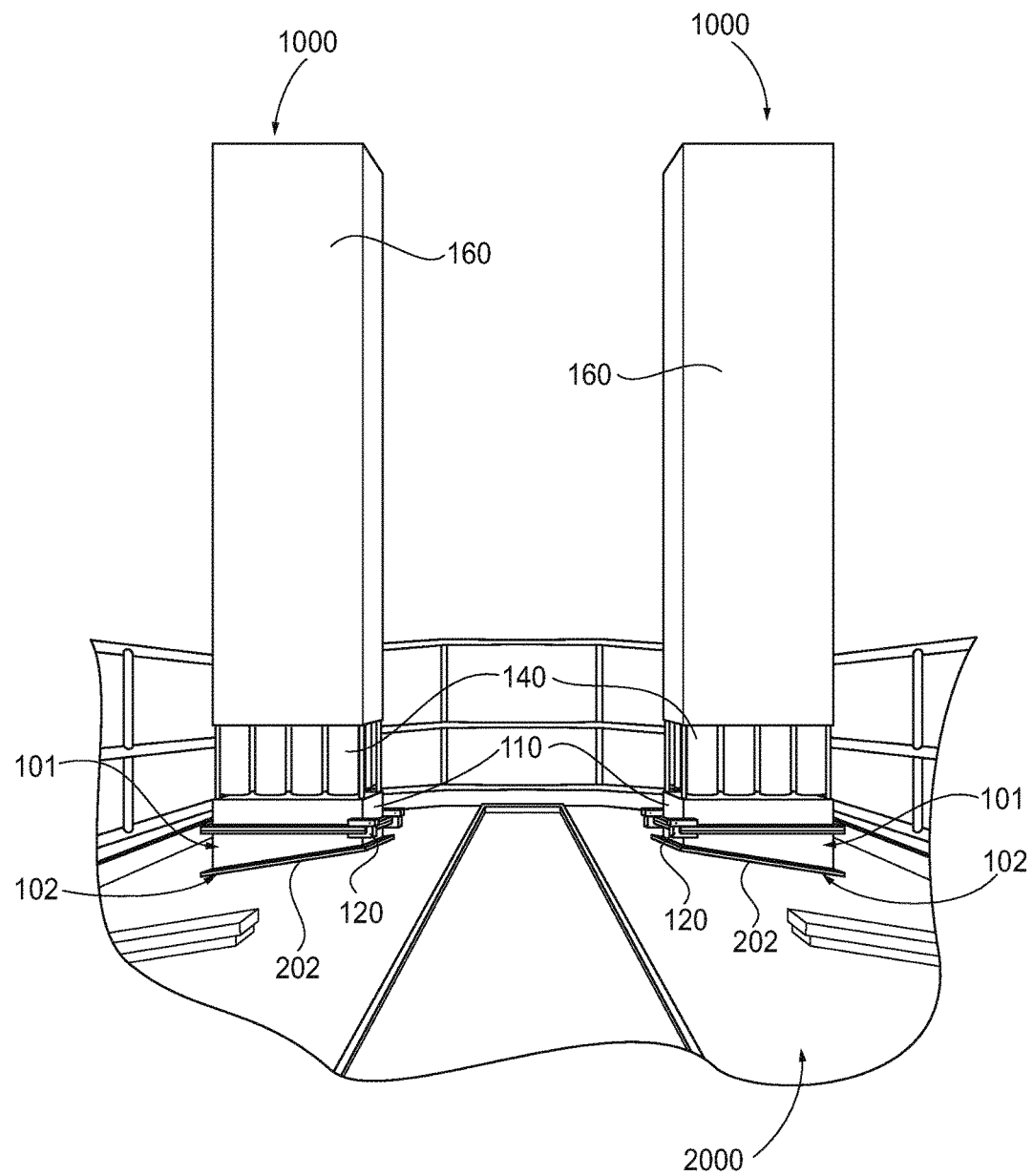
FIG. 2 is a front view of two dust filtration units of FIG. 1 mounted to a sand storage bin.
Figure 3:
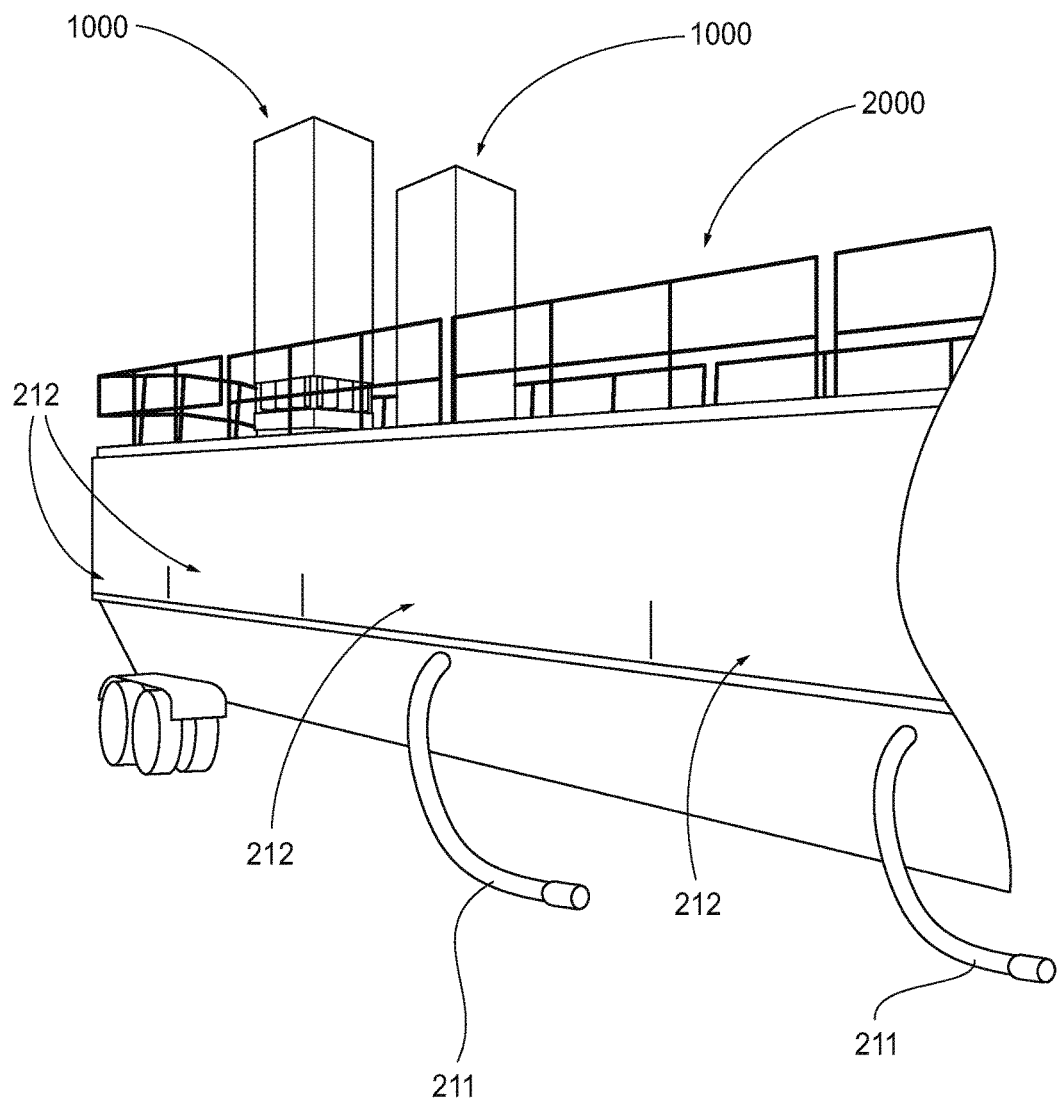
FIG. 3 is a side perspective view of the two dust filtration units and the sand storage bin of FIG. 2.

Referring now to FIG. 2 and FIG. 3, two dust filtration units 1000 are shown attached to two respective opened inspection hatches 202 of a sand storage bin 2000. The adapter base 101 of each dust filtration unit 1000 is secured to the opened inspection hatch 202. The adapter base 101 is a hollow, open-ended structure manufactured from a rigid material, such as mild steel. The adapter base 101 permits air laden with frac sand dust to pass through the inspection hatch 202 of the sand storage bin 2000 into the diffuser manifold 110 of each dust filtration unit 1000. The diffuser manifold 110 is an open-bottomed, cuboid structure manufactured from a rigid material, such as mild steel.

A mounting gasket (not shown) located between an adapter bottom rim 102 of the adapter base 101 and the inspection hatch 202 prohibits the escape of frac sand dust at the interface between the dust filtration unit 1000 and the sand storage bin 2000. The mounting gasket may be produced from any material suitable for this purpose, for example, closed cell rubber foam.

The inspection hatch 202 of most commercially available models of the storage bin 2000 is oriented at an angle of 14° to 20° relative to the horizon. The adapter bottom rim 102 of the adapter base 101 is angled relative to the angle of the inspection hatch 202 so that the plurality of filter bags 140 stand approximately vertical when the dust filtration unit 1000 is attached to the storage bin 2000.

Each dust filtration unit 1000 may be equipped with a cover 160 to protect the plurality of filter bags 140 from rain and snow.

Figure 4:
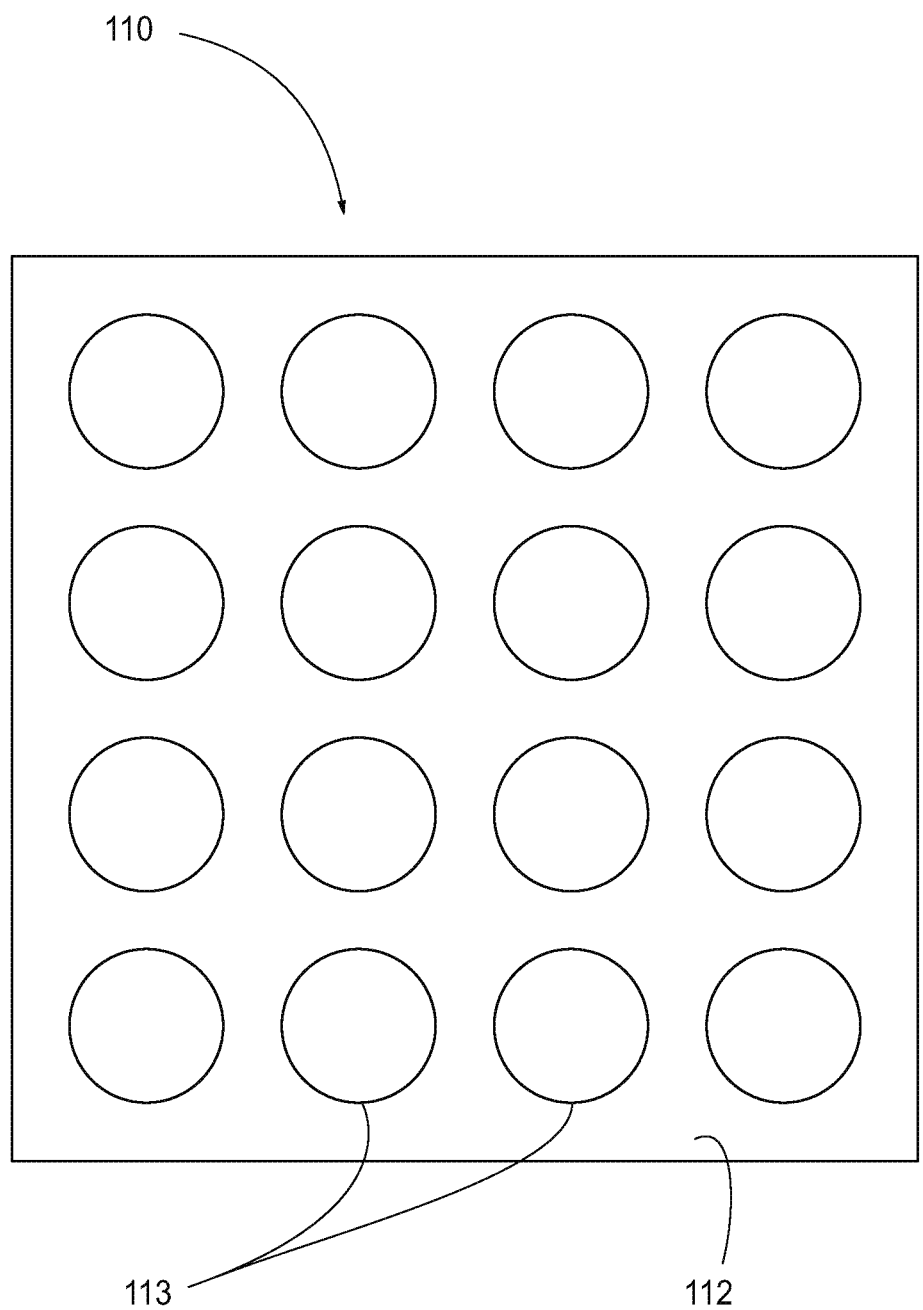
FIG. 4 is a layout schematic of the plurality of filter bag orifices of the dust filtration unit of FIG. 1.

Referring now to FIG. 4, a top plate 112 of the diffuser manifold 110 includes a plurality of filter bag orifices 113 into which the plurality of filter bags 140 attach. Dust-laden air entering the diffuser manifold 110 may pass through the filter bag orifices 113 and into the plurality of filter bags 140. A non-limiting embodiment of the diffuser top plate 112 includes, for example, sixteen filter bag orifices 113, each adapted to receive a filter bag 140.

Figure 5:
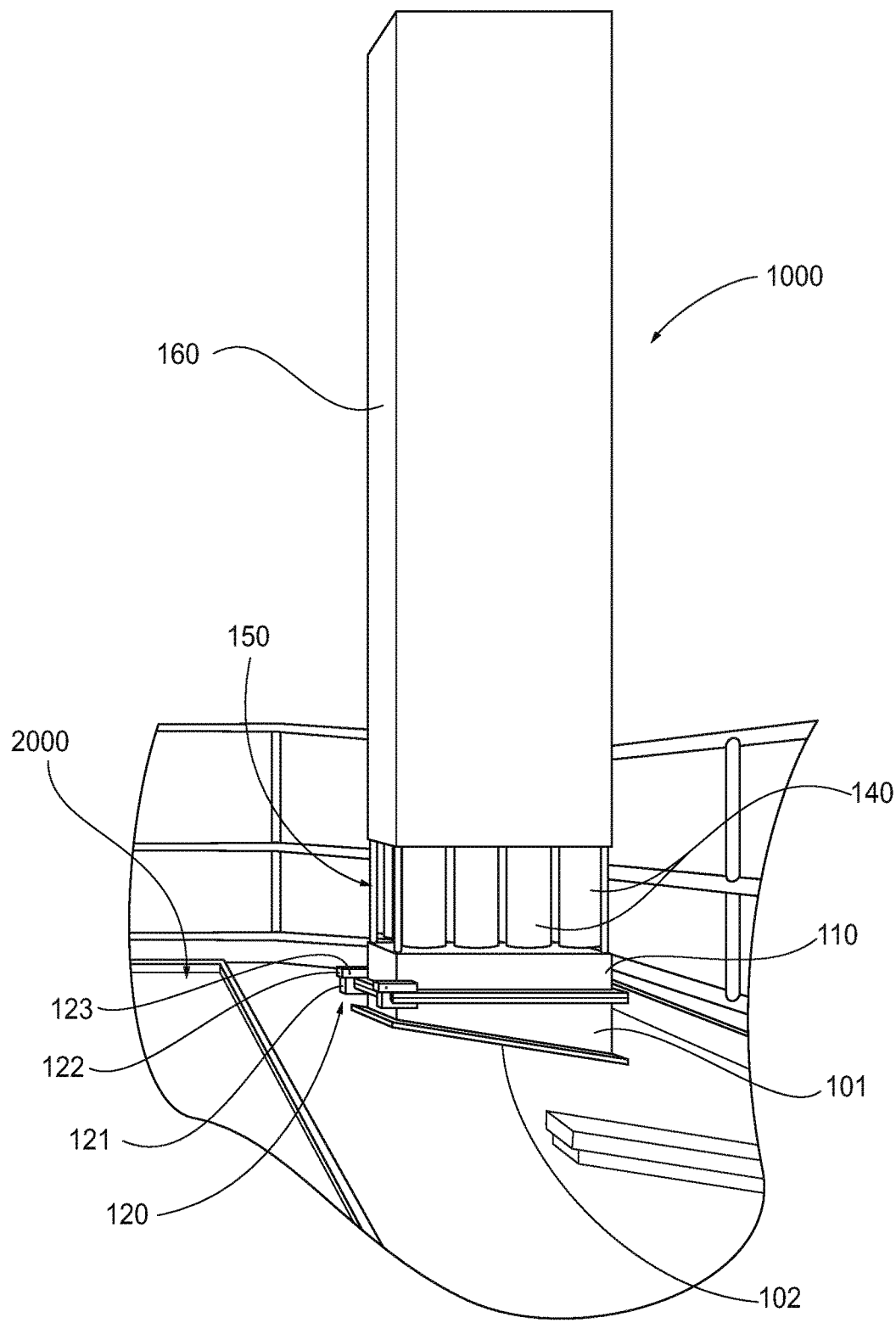
FIG. 5 is a front perspective view of the dust filtration unit of FIG. 1 mounted to a sand storage bin.
Figure 6:
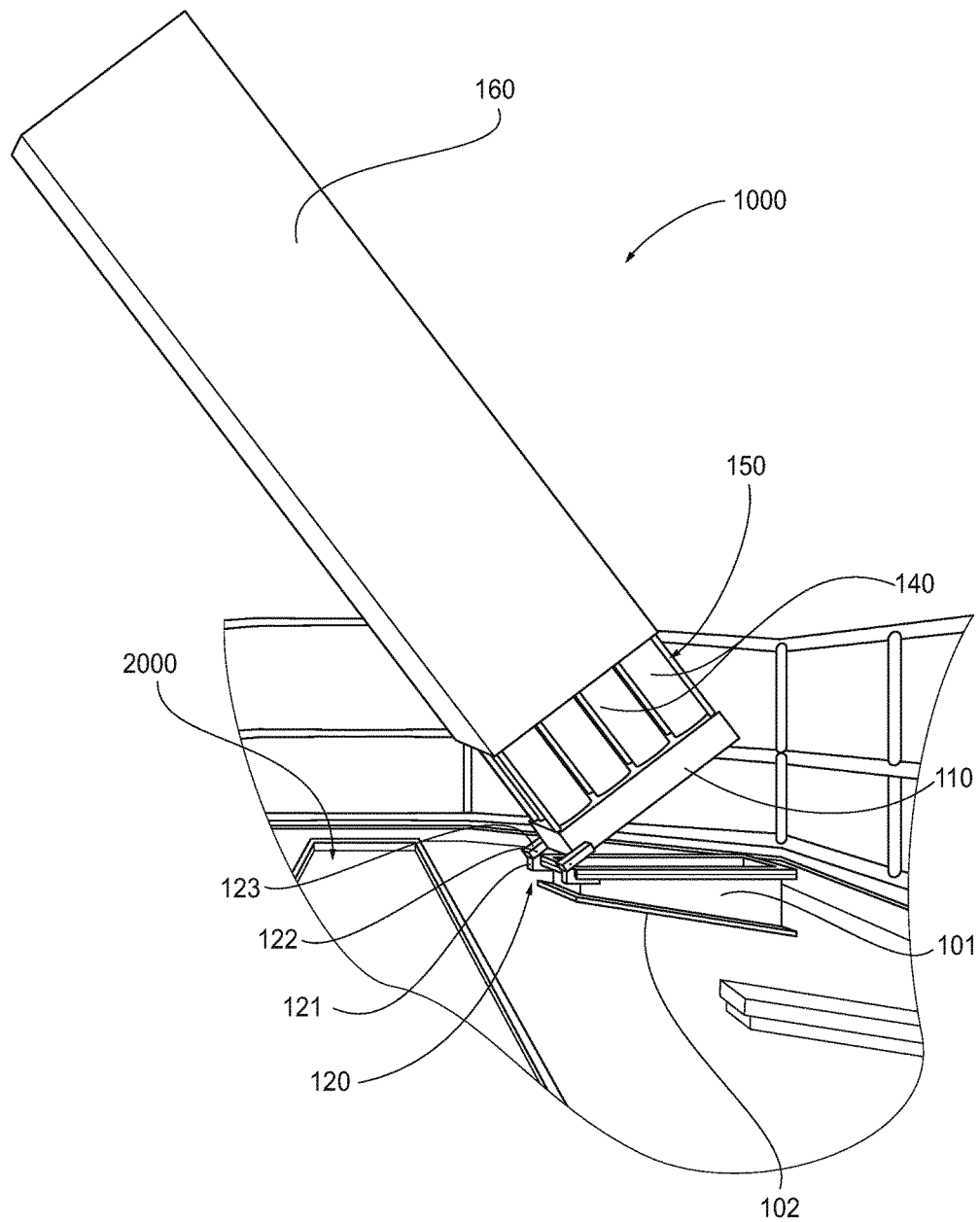
FIG. 6 is front perspective view of the dust filtration unit of FIG. 5, shown in an opened position.

Referring now to FIGS. 5 and 6, the hinge 120 permits the diffuser manifold 110 and all components attached thereto to be temporarily rotated away from the adapter base 101 to permit visual inspection of the inside of the sand storage bin 2000 through the inspection hatch 202. FIG. 5 shows the hinge 120 in the closed position, while FIG. 6 shows the hinge in the open position. The hinge 120 includes a lower arm 121 which is rigidly attached to the adapter base 101 and an upper arm 122 which is rigidly attached to the diffuser manifold 110. The lower arm 121 is rotatably connected to the upper arm 122 via a hinge pin 123. A hinge gasket (not shown) is located between the adapter base 101 and the diffuser manifold 110. The hinge gasket creates a seal which prohibits frac sand dust from escaping through the interface of the adapter base 101 and the diffuser manifold 110. The hinge gasket may be produced from any material suitable for this purpose, for example, closed cell rubber foam.

Figure 7:
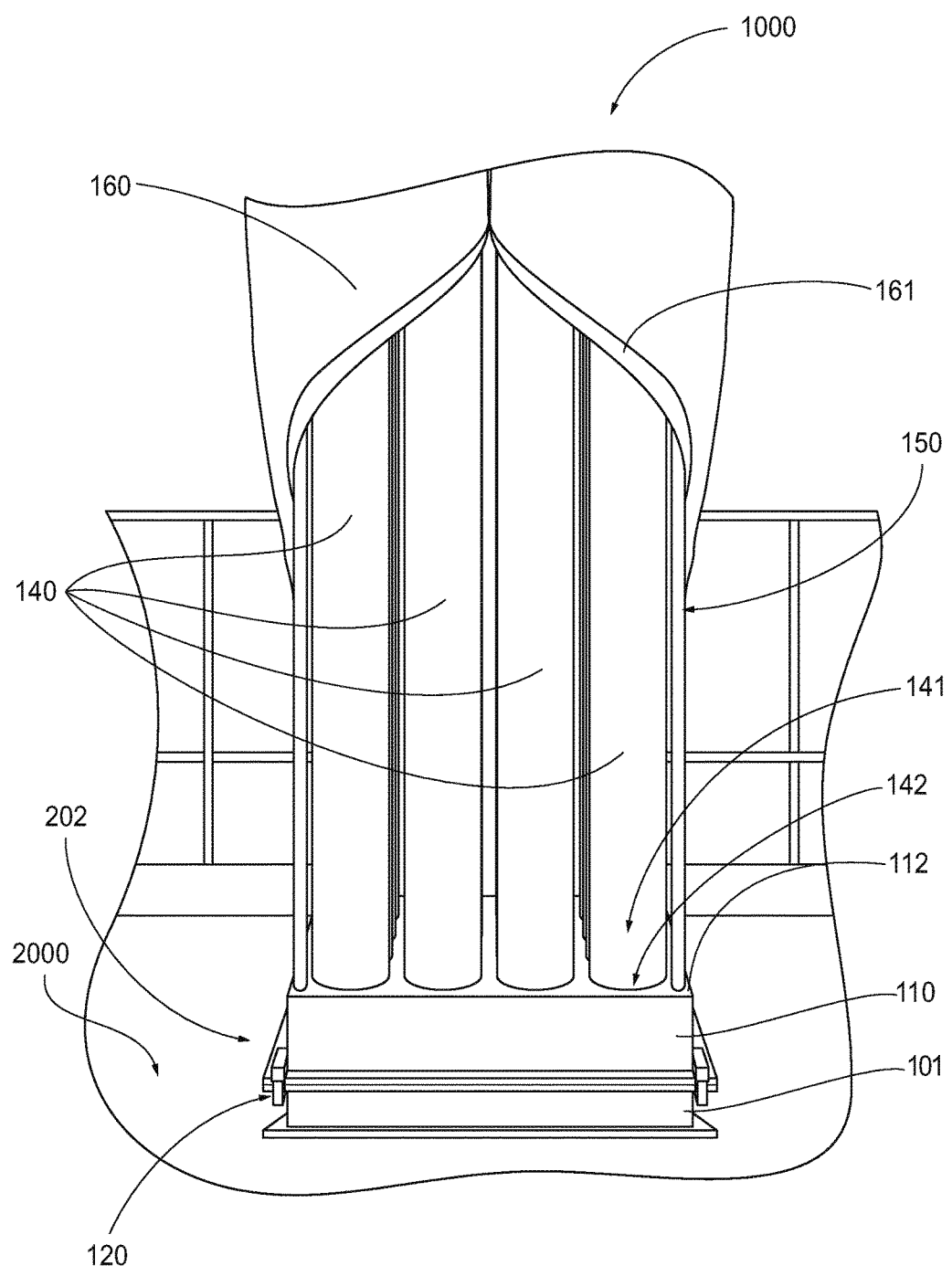
FIG. 7 is a side view of a lower portion of a dust filtration unit of FIG. 1.
Figure 8:
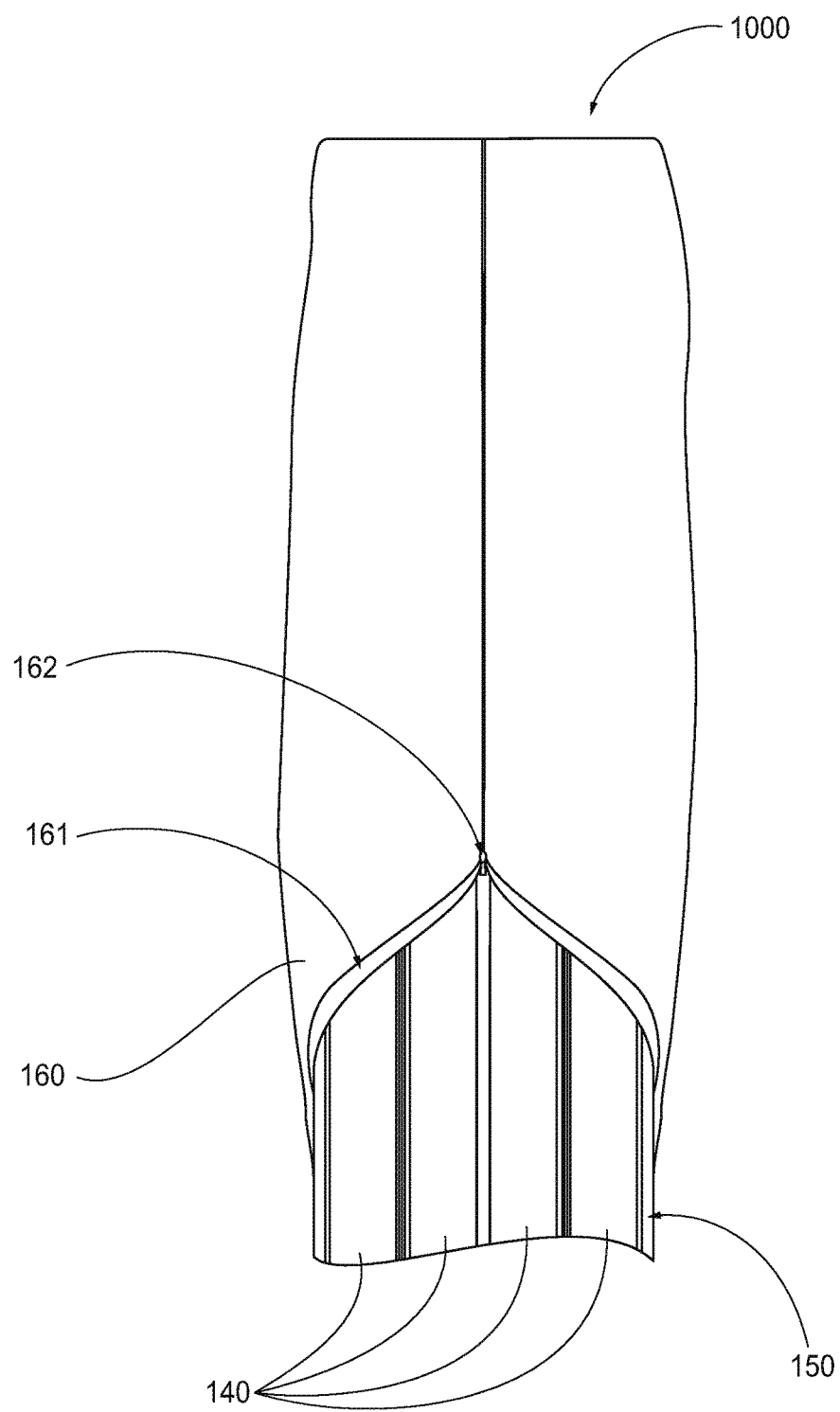
FIG. 8 is a side view of an upper portion of a dust filtration unit of FIG. 1.
Figure 9:
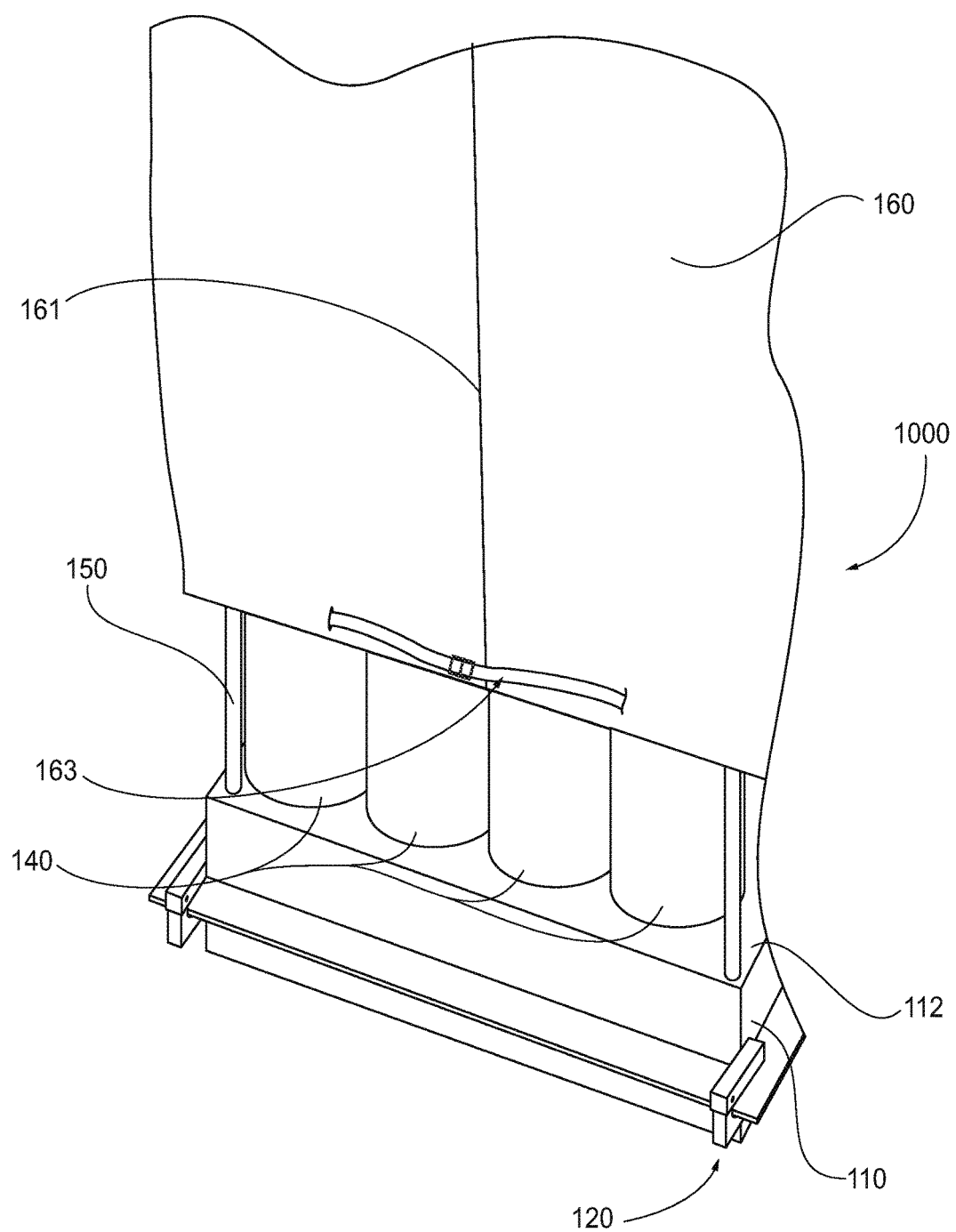
FIG. 9 is a perspective view of a lower portion of a dust filtration unit of FIG. 1.

Referring now to FIGS. 7-9, the weather cover 160 encloses at least a top portion of the support frame 150 to prevent the plurality of filter bags 140 from getting wet due to rain or snow. Moisture on the plurality of filter bags 140 would cause frac sand dust to stick to the inside of the filter bags 140, rather than falling back into the storage bin 2000. As a result, the plurality of filter bags 140 would become clogged, reducing their filtration capacity. The weather cover 160 may be constructed from any water-repellant or waterproof material suitable for protecting the filter bags 140 from rain and snow, such as waterproof canvas.

In a non-limiting embodiment, the weather cover 160 includes a slit 161 along at least one side of the weather cover 160, which may be opened and closed by a zipper 162. The slit 161 may be opened to facilitate easy installation of the weather cover 160 over the support frame 150. The slit 161 may then be closed, using the zipper 162, once the weather cover 160 is in place on the support frame 150. In another non-limiting embodiment, the weather cover may include a binder strap 163, as shown in FIG. 9, to further secure the weather cover 160 to the support frame 150.

Figure 10:
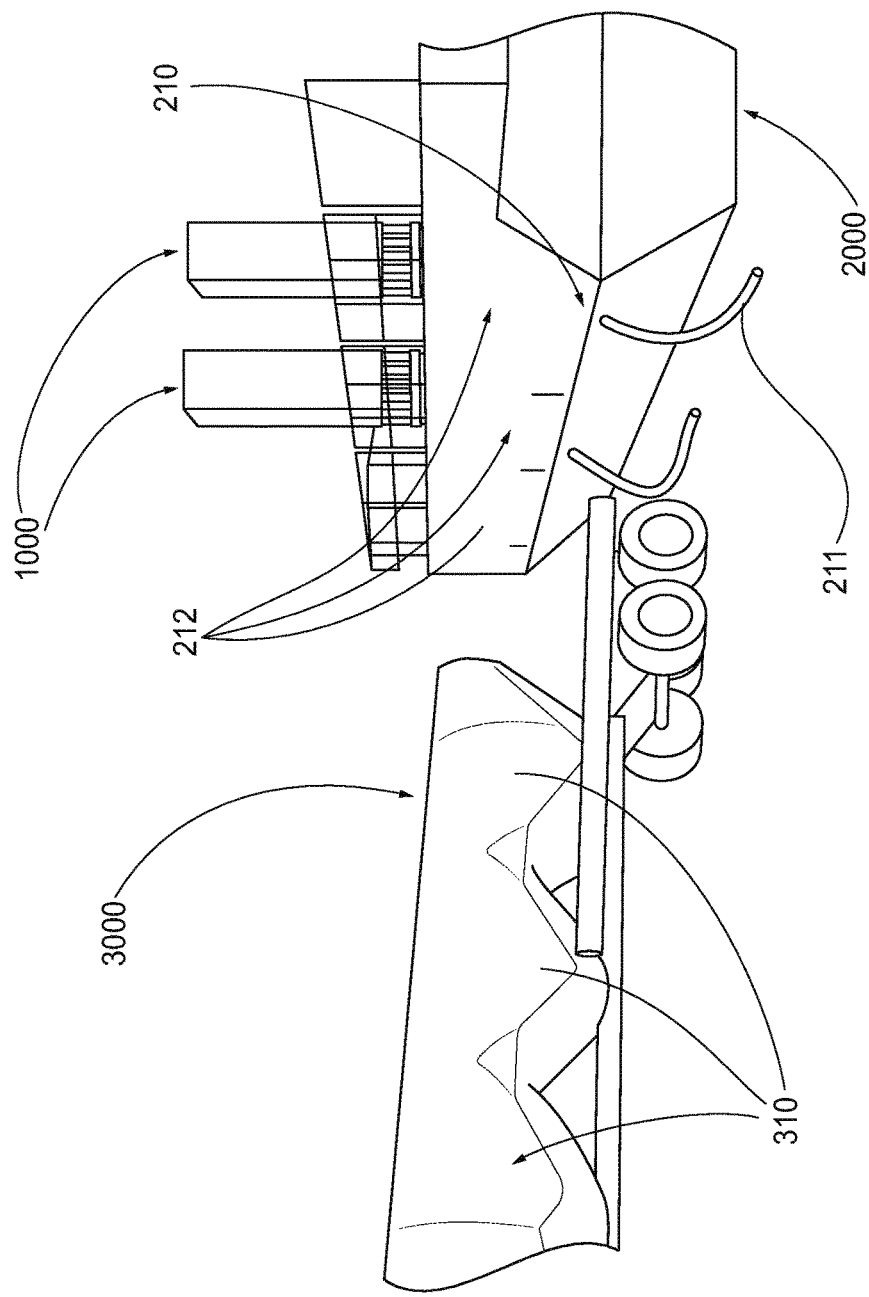
FIG. 10 is a perspective view of a frac sand offloading site, including two dust filtration units of FIG. 1.

Referring now to FIG. 10, a frac sand offloading site is shown. A pneumatic trailer 3000 having one or more hoppers 301 filled with frac sand is positioned proximate to the sand storage bin 2000 into which the frac sand will be unloaded. An outlet port on the pneumatic trailer 3000 is coupled to an inlet port 210 on the storage bin 2000 via a connecting conduit 211. The storage bin 2000 includes at least one storage compartment 212, each compartment 212 having a respective inlet port 210 and one or more inspection hatches 202. One or more inspection hatches 202 on the storage bin 2000 are fitted with dust filtration units 1000.

Once the pneumatic trailer 3000 is coupled to the inlet port 210 on the storage bin 2000, a blower on the pneumatic trailer 3000 delivers pressurized air to the hoppers 301 of the pneumatic trailer 3000. The pressurized air forces the frac sand out of the hoppers 301, through the connecting conduit 211 and inlet port 210, and into the storage compartment 212 of the storage bin 2000.

The force of the pressurized air propelling the frac sand from the pneumatic trailer 3000 to the storage bin 2000 causes dust within the frac sand to become airborne. Incoming pressurized air from the pneumatic trailer 3000 forces the dust-laden air out of the storage bin 2000 and into one or more dust filtration units 1000, each attached to an opened inspection hatch 202 of the storage bin 2000. Each dust filtration unit 1000 is permeable to air but is impermeable to the frac sand dust.

The frac sand dust, which cannot permeate the plurality of filter bags 140, accumulates on the inside of the plurality of filter bags 140, forming cakes of dust. As more air laden with frac sand dust is forced into the plurality of filter bags 140, the cakes of dust accumulate on the inside of the filter bags 140 until the weight of the cakes of dust exceeds the shear strength holding the cakes to the filter bags 140. The cakes of dust then fall out of the filter bags 140, through the diffuser manifold 110 and the adapter base 101, and back into the storage bin 2000 due to gravity. In this manner, the frac sand dust is retained in the storage bin 2000 by the dust filtration unit 1000, while air pressure generated by the pneumatic trailer 3000 is released into the atmosphere.

The invention claimed is:

1. A dust filtration unit for a frac sand storage bin, the dust filtration unit comprising:
   an adapter base adapted for attachment to an opened inspection hatch on the sand storage bin;
   a diffuser manifold attachable to the adapter base, a top plate of the diffuser manifold defining a plurality of filter bag orifices;
   a hinge attached to the diffuser manifold configured to pivot the diffuser manifold and the top plate of the diffuser manifold from an opened position where the diffuser manifold is not directly attached to the adapter base to a closed position where the diffuser manifold is sealed to the adapter base; and
   a plurality of filter bags, each of the plurality of filter bags releasably attached to one of the plurality of filter bag orifices.

2. The dust filtration unit of claim 1, wherein a bottom rim of the adapter base is angled at 14° to 20° relative to the horizon such that the plurality of filter bags stand vertically when the dust filtration unit is mounted to the frac sand storage bin.

3. The dust filtration unit of claim 1, further comprising a gasket between the adapter base and the diffuser manifold.

4. The dust filtration unit of claim 1, wherein the adapter base is a hollow, open-ended, rigid structure.

5. The dust filtration unit of claim 1, wherein the diffuser base is an open-bottomed, rigid structure.

6. The dust filtration unit of claim 1, further comprising a support frame surrounding the plurality of filter bags, wherein a closed end of each of the plurality of filter bags is attached to the support frame.

7. The dust filtration unit of claim 6, further comprising a weather cover surrounding at least a top portion of the support frame.

8. The dust filtration unit of claim 1, wherein the plurality of filter bags are permeable to air and impermeable to frac sand dust.

9. A dust filtration unit for a frac sand storage bin, the dust filtration unit comprising:
   an adapter base adapted for attachment to an opened inspection hatch on the sand storage bin;
   a diffuser manifold attached to the adapter base, a top plate of the diffuser manifold defining a plurality of filter bag orifices;
   a plurality of filter bags, each of the plurality of filter bags releasably attached to one of the plurality of filter bag orifices;
   a support frame surrounding the plurality of filter bags, wherein a closed end of each of the plurality of filter bags is attached to the support frame; and
   a weather cover surrounding at least a top portion of the support frame, wherein the weather cover is secured to the support frame with at least one of a zipper and a binding strap.

10. The dust filtration unit of claim 9, further comprising a hinge between the adapter base and the diffuser manifold, wherein the hinge rotatably attaches the adapter base to the diffuser manifold.

11. The dust filtration unit of claim 10, wherein the hinge is rotatable between a closed position in which the adapter base is sealingly connected to the diffuser manifold, and an opened position in which the fill level of the frac sand storage bin may be monitored.

12. The dust filtration unit of claim 9, further comprising a gasket between the adapter base and the diffuser manifold.

13. The dust filtration unit of claim 9, wherein the adapter base is a hollow, open-ended, rigid structure.

14. The dust filtration unit of claim 9, wherein the diffuser base is an open-bottomed, rigid structure.

15. The dust filtration unit of claim 9, wherein the plurality of filter bags are permeable to air and impermeable to frac sand dust.

16. The dust filtration unit of claim 9, wherein a bottom rim of the adapter base is angled at 14° to 20° relative to the horizon such that the plurality of filter bags stand vertically when the dust filtration unit is mounted to the frac sand storage bin.

17. A method for preventing the release of frac sand dust into the atmosphere during the unloading of frac sand from a pneumatic trailer, the method comprising:
   providing a frac sand storage bin having an inspection hatch;
   attaching a dust filtration unit to the hatch, the dust filtration unit comprising an adapter base, a diffuser manifold, and a plurality of filter bags attached to the diffuser manifold, wherein the diffuser manifold is rotatably attached to the adapter base via a hinge;
   coupling an outlet port of the pneumatic trailer to the frac sand storage bin; and
   displacing the frac sand from the pneumatic trailer into the frac sand storage bin.

18. The method of claim 17, further comprising securing a weather cover to the dust filtration unit.

19. The method of claim 17, wherein dust generated by displacing the frac sand from the pneumatic trailer into the frac sand storage bin is contained by the dust filtration unit.

20. The method of claim 17, wherein air is permitted to permeate the plurality of filter bags of the dust filtration unit.

* * * * *